(12) United States Patent
Mizutani et al.

(10) Patent No.: US 6,384,137 B1
(45) Date of Patent: May 7, 2002

(54) MOLDED RESIN PRODUCT HAVING VARIED WALL THICKNESS AND RESIN COMPOSITION FORMING THE SAME

(75) Inventors: Haruyasu Mizutani; Yasuaki Tanaka; Tadashi Yamamoto, all of Aichi; Chisato Masuya, Gifu, all of (JP)

(73) Assignee: Toyoda Gosei Co., Ltd. (JP)

( * ) Notice: Subject to any disclaimer, the term of this patent is extended or adjusted under 35 U.S.C. 154(b) by 0 days.

(21) Appl. No.: 09/643,712

(22) Filed: Aug. 23, 2000

(30) Foreign Application Priority Data

Aug. 24, 1999 (JP) ............................................ 11-236624

(51) Int. Cl.$^7$ ................................................ C08L 53/00
(52) U.S. Cl. ......................................................... 525/88
(58) Field of Search ........................................... 525/88

(56) References Cited

U.S. PATENT DOCUMENTS 5,965,654 A * 10/1999 Hirata ........................ 524/451

FOREIGN PATENT DOCUMENTS

| EP | 58-210949 | 12/1983 |
|---|---|---|
| EP | 0 132 931 | 2/1985 |
| EP | 0 204 400 | 12/1986 |
| EP | 0 784 074 A1 | 7/1997 |
| GB | 2 254 618 A | 10/1992 |
| JP | 55-139447 | 10/1980 |
| JP | 2-69549 | 3/1990 |
| JP | 10-306195 | 11/1998 |
| WO | 98/32795 | 7/1998 |
| WO | 99/05007 | 2/1999 |

* cited by examiner

Primary Examiner—Paul R. Michl
(74) Attorney, Agent, or Firm—Pillsbury Winthrop LLP

(57) ABSTRACT

The present invention is directed to a molded resin product and resin composition form making the same. The molded resin product includes at least one thick wall portion, at least one thin wall portion, and at least one thickness changing portion extending between the thick wall portion and the thin wall portion. The resin composition being used for forming the molded resin product includes 0.01–0.1 part by weight of a delustering agent and 100 parts by weight of blend components comprising: 30–50% by weight of a polypropylene block copolymer containing 4–20% by weight of ethylene, 0–10% by weight of polyethylene, 5–15% by weight of a propylene/butene copolymer, and 40–60% by weight of an ethylene/α-olefin copolymer rubber.

14 Claims, 6 Drawing Sheets

*Prior Art*

FIG. 6(a)

*Prior Art*

FIG. 6(b)

MOLDED RESIN PRODUCT HAVING VARIED WALL THICKNESS AND RESIN COMPOSITION FORMING THE SAME

CROSS REFERENCE TO RELATED APPLICATION

This application relates to and claims priority under 35 USC §119 on Japanese Patent Application No.: JP236,624/1999, filed on Aug. 24, 1999.

FIELD OF THE INVENTION

The present invention relates to the formation of various molded resin products having varied wall thicknesses. The present invention also relates to a resin composition for making such products in a way that prevents visible imperfections often associated with changes in wall thickness of molded products.

BACKGROUND OF THE INVENTION

Injection molding is a known molding technique for forming a molded product from a resin material. In injection molding, a molten resin is injected from a gate of a mold into a cavity thereof, so as to fill the cavity with the resin. After the resin has cooled, the mold is opened to permit removal of the molded resin product.

Figure 6A:
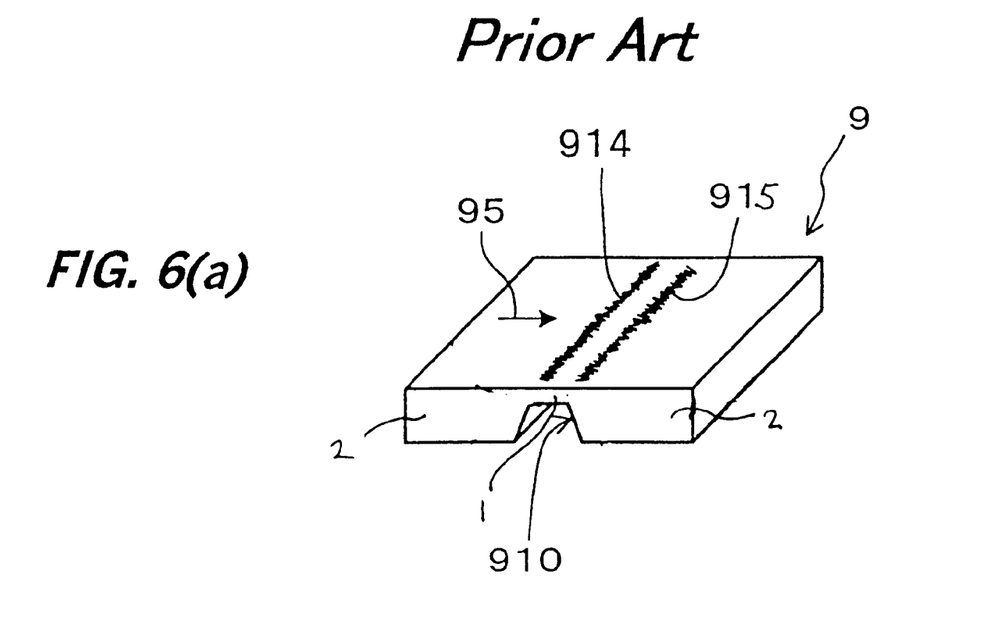
FIG. 6(a) is a perspective view of a prior art molded resin product illustrating flashing stripes associated with changes in wall thickness.

FIG. 6(a) illustrates a molded resin product produced by conventional injection molding techniques using conventional molding materials. The molded resin product 9 has a portion 910 with reduced thickness (e.g. a groove). Flashing stripes 914 and 915 (i.e., areas of luster unevenness) have formed in the surface of the product 9 in the areas were the wall thickness changes. In the molded resin product 9, illustrated in FIG. 6(a), the groove 910 extends generally orthogonal to the direction of resin flow, illustrated by arrow 95. The flashing stripes 914 and 915 are generated on both sides of the groove 910.

Figure 6B:
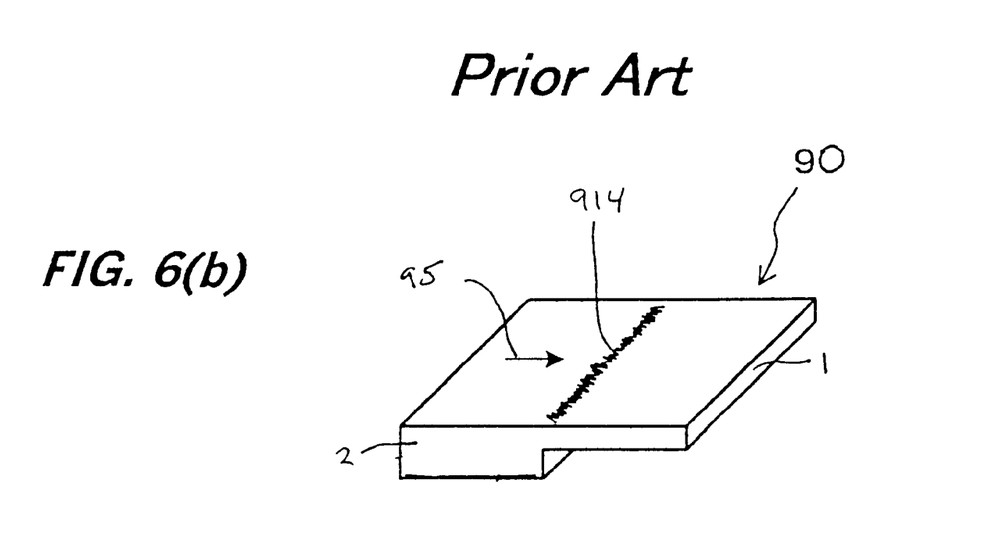
FIG. 6(b) is a perspective view of another prior art molded resin product illustrating a flashing stripes associated with a change in wall thickness of the molded product.

FIG. 6(b) illustrates another molded resin product 90 produced by conventional injection molding techniques also using conventional molding materials. The molded resin product 90 has a stepwise reduction in wall thickness and a flashing stripe 914 is generated in the surface adjacent the reduction in wall thickness thereof.

The flashing stripes 914 and 915 produced in the molded resin product 9 and the flashing stripe 914 produced in the molded resin product 90 may be produced by residual stresses and negative pressures. The flashing stripes 914 in FIGS. 6(a) and FIG. 6(b) are formed in the area where the wall thickness of the product is reduced. Flow of resin through the mold is choked in this area, which produces residual stresses causing grain gap.

The flashing stripe 915 in FIG. 6(a) is formed in the area where there is an increase in the thickness of the wall of the product 9. In this area, there is poor flow of resin based on the negative pressure associated with the enlarged wall thickness.

Consequently, there is a need for a resin composition that forms a molded product free of visual imperfections where such products have varying wall thicknesses and where appearance is important.

OBJECTS OF THE INVENTION

It is, therefore, an object of the present invention to produce a molded resin product that is free of visual imperfections.

It is also an object of the present invention to provide a molded resin product having improved visual properties.

It is another object of the present invention to provide a resin composition for use in forming molded products having varying wall thicknesses.

It is another object of the present invention to provide a molded resin product without flashing stripes in areas of changes of wall thickness.

It is another object of the present invention to provide a resin composition containing a delustering agent.

Additional objects and advantages of the invention are set forth, in part, in the description which follows, and, in part, will be apparent to one of ordinary skill in the art from the description and/or practice of the invention.

SUMMARY OF THE INVENTION

In response to the foregoing challenges, applicants have developed an innovative resin composition for forming molded resin products that are substantially free of visual imperfections. The resin composition in accordance with the present invention includes a delustering agent and a blend of components. The resin composition includes 0.01–0.1 part by weight of the delustering agent, and 100 parts by weight of a blend of components. The blend of components includes 30–50% by weight of a polypropylene block copolymer containing 4–20% by weight of ethylene, 0–10% by weight of polyethylene, 5–15% by weight of a propylenelbutene copolymer, and 40–60% by weight of an ethylene/α-olefm copolymer rubber.

In accordance with the present invention, the ethylene/α-olefin copolymer rubber may have a glass transition point of −45° C. or lower. The polyethylene may have a density of not more than 0.95 g/cm$^3$. It is also contemplated that the polyethylene content in the resin composition is 0% by weight. The butene content by percentage in the propylene/butene copolymer may vary from 10% to 30% by weight.

The present invention is also directed to a molded resin product. The molded resin product includes at least one thick wall portion, and at least one thinner wall portion. Also, the molded product can have at least one changing thickness portion that extends between thick and thinner wall portions, mentioned above. The molded resin product molded in accordance with the present invention is formed from a resin composition comprising 0.01–0.1 part by weight of a delustering agent and 100 parts by weight of a blend of components. The blend of components may be as noted above and include 30–50% by weight of a polypropylene block copolymer containing 4–20% by weight of ethylene, 0–10% by weight of polyethylene, 5–15% by weight of a propylene/butene copolymer, and 40–60% by weight of an ethylene/α-olefin copolymer rubber.

The molded resin product may be formed by injection molding. However, other methods of forming molded resin products are also to be considered well within the scope of the present invention.

In accordance with the present invention, the thickness of the portion changing in thickness may gradually decrease from the thick wall portion to the thinner wall portion. Similarly, the thickness of the portion that is changing in thickness may gradually increase from the thinner wall portion to the thicker wall portion.

It is also contemplated that the portion changing in thickness may exhibit stepwise thickness changes as well as or in lieu of gradual changes. The portion changing in thickness may have at least one stepwise decrease in thickness between the thick wall portion and the thinner wall portion. Alternatively, the changing in thickness portion may have at least one stepwise increase in thickness between the thinner wall portion and the thicker wall portion.

BRIEF DESCRIPTION OF THE DRAWINGS

The invention will be described in conjunction with the following drawings in which like reference numerals designate like elements and wherein.

DETAILED DESCRIPTION OF THE PREFERRED EMBODIMENTS

Figure 1:
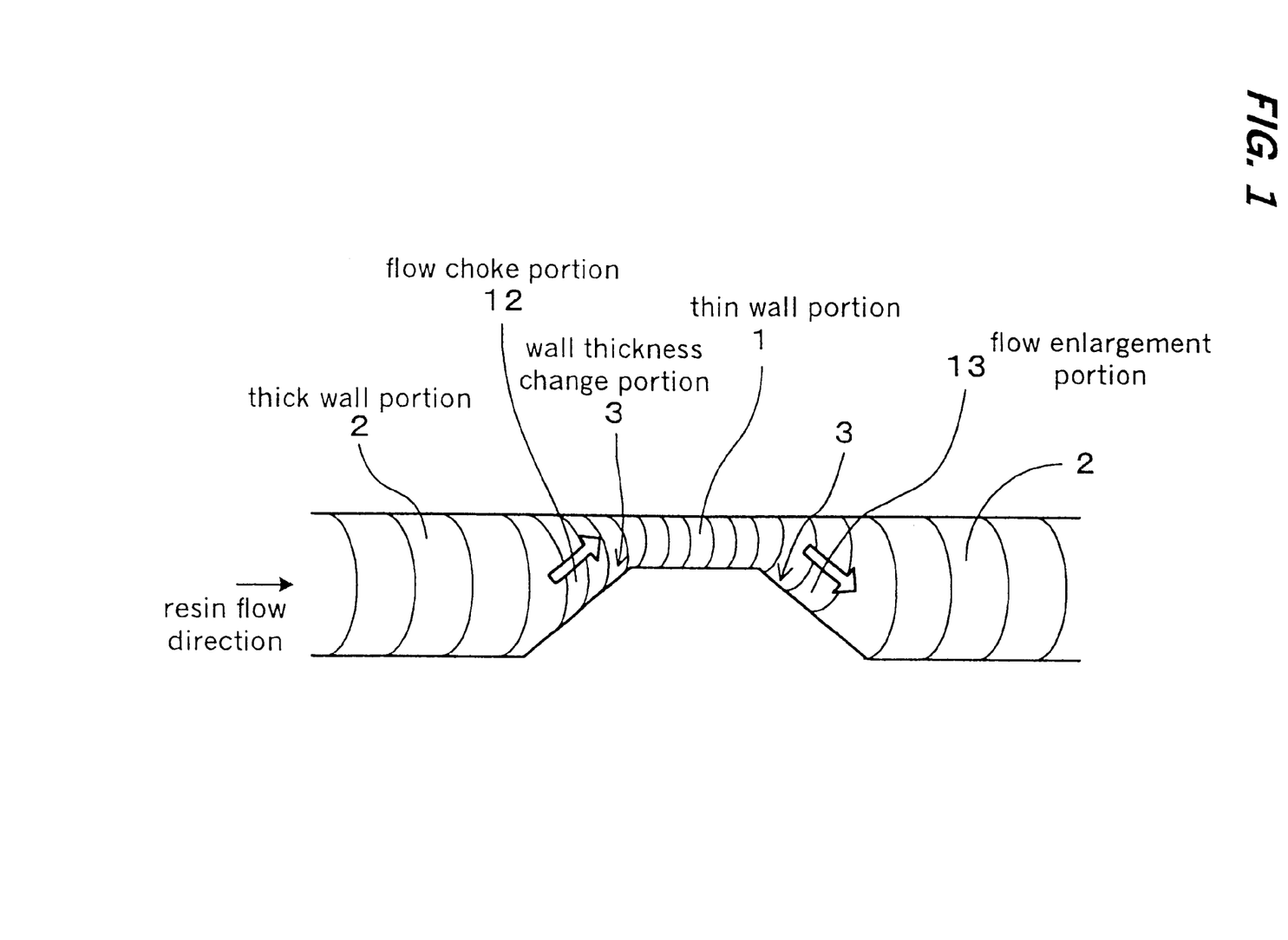
FIG. 1 is a schematic illustrating view showing resin flow characteristics associated with changes in wall thickness.

The present invention is directed to the formation of various molded resin products having walls of varying thicknesses. The products described below are merely illustrative of the numerous products that can be formed using various molding techniques and the resin composition described below. The molded resin products formed in accordance with the present invention include thick wall portions 2, and thin wall portions 1. In general, the thick wall portions 2 have a thickness greater than the thin wall portions 1. Located between the thick wall portion 2 and the thin wall portion 1 is a portion where the thickness changes from thin to thick and from thick to thin. In the thickness changing portion, the wall thickness my gradually change between the thick wall portion 2 and the thin wall portion 1. Alternatively, the thickness change can occur in a stepwise manner. As shown in FIG. 1, examples of the thickness change portion include a flow choke portion 12, where the wall thickness is reduced from a thick wall portion 2 to a thin wall portion 1, and a flow enlargement portion 13 where wall thickness is increased from the thin wall portion 1 to another thick wall portion 2.

Molded Product Shapes

Several examples of molded resin products formed in accordance with the present invention are shown in FIGS. 2(a)–2(e). These figures illustrate exemplary types of thickness changes and are only illustrative. There are others and other combinations.

Figure 2:
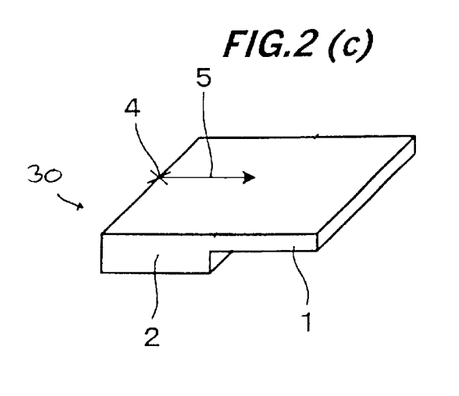
FIGS. 2(a)–2(e) are a series of perspective views of various molded resin products formed from the resin composition in accordance with the present invention.
Figure 2A:
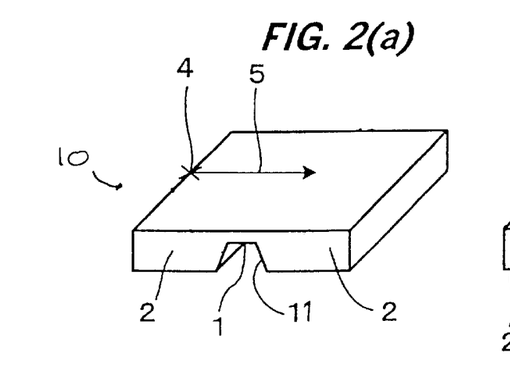

The molded resin product 10, illustrated in FIG. 2(a), includes a thin wall portion 1 associated with a bottom portion of a groove 11. The groove 11 and thin wall portion 1 extend in a direction transverse to the direction of resin flow 5 from gate 4. Groove 11 also extends between adjacent thick wall portions 2. Thickness changes on both sides of the thin wall portion 1. Although a single groove 11 is illustrated, the present invention is not limited to a single thin wall portion 1; rather, it is contemplated that the molded resin product 10 may include multiple grooves 11. Furthermore, it is contemplated that the grooves 11 may extend in any direction. Additionally, the thickness of the groove may vary.

Figure 2B:
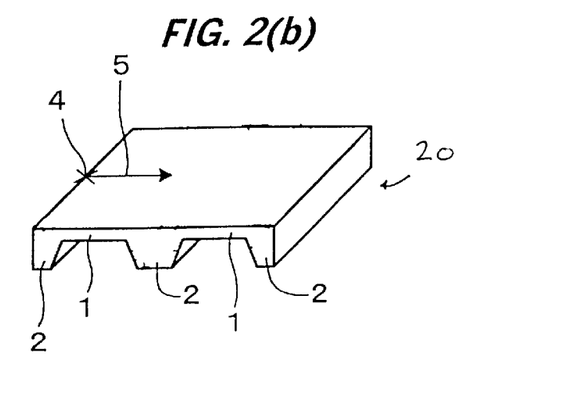

The molded resin product 20, illustrated in FIG. 2(b), includes multiple thick wall portions 2 formed as ribs between thin wall portions 1. Like the resin product 10, the changing thickness portion extends in a direction crossing the direction of resin flow 5 on both sides of each of the thin wall portions 1.

The molded resin product 30, illustrated in FIG. 2(c), includes a thick wall portion 2 formed adjacent the gate 4 followed by a stepwise decrease in thickness to a thin wall portion 1 downstream from the gate 4.

Figure 2D:
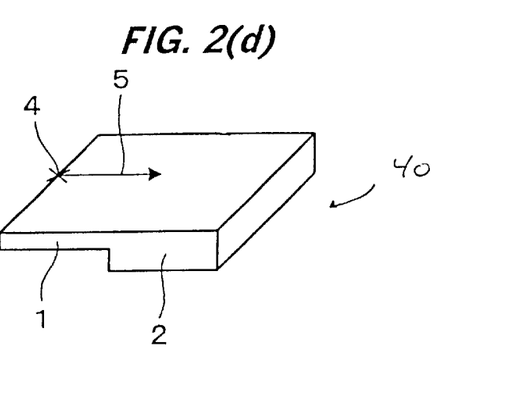

The molded resin product 40, illustrated in FIG. 2(d), also includes a stepwise thickness changing portion. A thin wall portion 1 is formed at the upstream side of the direction of resin flow 5 followed by a stepwise increase in thickness to a thicker wall portion 2 formed at the downstream side thereof.

Figure 2E:
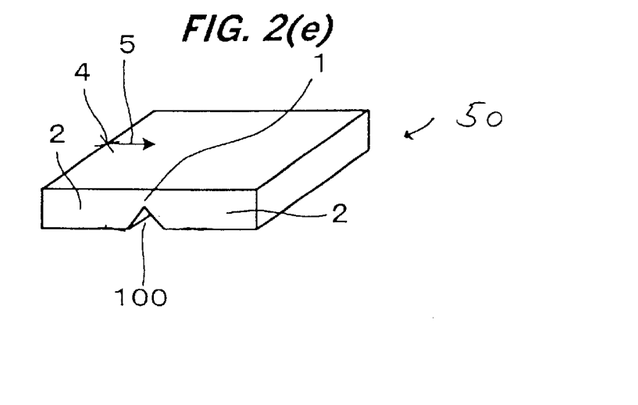

The molded resin product 50, illustrated in FIG. 2(e), includes a thin wall portion 1 formed as part of a bottom portion of a triangular shaped groove 100 formed in a direction crossing the direction of resin flow 5 and between thick wall portions 2.

The above described molded resin products 10, 20, 30, 40 and 50 have numerous applications. It is also contemplated that these examples may be combined. For example, the resin molded product may include both stepwise increases and decreases in wall thickness. Furthermore, it is contemplated that resin products may include stepwise and/or gradual changes in wall thicknesses. Examples of the molded resin product of the present invention include airbag covers for cars, and car parts such as an instrument panel, a bumper, a door pillar, weather striping, door trim, shift lever boots, column covers, console boxes, side braids, bumper braids, wheel caps, locker braids, engine covers, and timing belt covers. Numerous other applications are contemplated and are considered to be within the scope of the present invention.

Resin Composition

The resin composition used in forming the above-described molded resin products will now be described. The resin composition comprises a blend of components including a polypropylene block copolymer, polyethylene, a propylene/butene copolymer, an ethylene/α-olefin copolymer rubber, and a delustering agent.

The polypropylene block copolymer content by percentage in the blend components is 30–50% by weight. If the content by percentage is below 30% by weight, a flow mark may be generated by a drop in fluidity or luster may increase. If the content by percentage is over 50% by weight, impact strength may drop. The ethylene content by percentage in the polypropylene block copolymer is 4–20% by weight. If the content by percentage is below 4% by weight, impact strength of a molded resin product may drop or a flow mark may be generated by a drop in rubber dispersibility. If the content by percentage is over 20% by weight, heat resistance and rigidity may drop.

The polyethylene content by percentage in the blend components is preferably from 0–10% by weight. If the content by percentage is over 10% by weight, heat resistance may drop. It is contemplated that the resin composition in accordance with the present invention may contain no polyethylene.

The propylene/butene copolymer content by percentage in the blend components is 5–15% by weight. If the content by percentage is below 5% by weight, flashing may increase or a flow mark may be generated. If the content by percentage is over 15% by weight, impact strength may drop.

The butene content by percentage in the propylene/butene copolymer is preferably 10–30% by weight. If the content by percentage is below 10% by weight, impact strength may drop or a flow mark may be generated by a drop in rubber dispersibility. If the content by percentage is over 30% by weight, moldability (mold releasing ability) may deteriorate by a drop in rigidity. The butene content by percentage in the propylene/butene copolymer is more preferably 20–30% by weight.

The ethylene/α-olefin copolymer rubber content by percentage in the blend components is 40–60% by weight. If the content by percentage is below 40% by weight, impact strength of the molded resin product may drop. If the content by percentage is over 60% by weight, a flow mark may be generated by a drop in fluidity.

The ethylene/α-olefin copolymer rubber preferably has a glass transition point of −45° C. or lower. This causes an improvement in A/B cleavage in the case that the molded resin product is used as an airbag cover. On the other hand, if the glass transition point is −45° C. or higher, the A/B cleavage may drop. A/B cleavage relates to the nature that an airbag cover cleave at a given position when the airbag cover is expanded by impact.

In accordance with the present invention, a delustering agent is added to the resin composition. The delustering agent content is 0.01–0.1 part by weight per 100 parts by weight of the blend components. If the content is below 0.01 part by weight, delustering ability may be insufficient. If the content is over 0.1 part by weight, the physical properties of the molded product may drop due to a drop in molecular weight.

Examples of the delustering agent which can be used include: i) delustering agents of ketone peroxides such as methyl ethyl ketone peroxide, cyclohexane peroxide, and acetylacetone peroxide; ii) delustering agents of peroxyketals such as 1,1-bis(t-butylperoxy)3,3,5-trimethylcyclohexane, and 1,1-bis(t-butylperoxy)cyclododecane;iii) delustering agents of hydroperoxides such as t-hexylhydroperoxide and t-butylhydroperoxide; iv) delustering agents of dialkylperoxides such as 1,3-bis(t-butylperoxy)diisopropylbenzene, α,α'-bis(t-butylperoxy) diisopropylbenzene, dicumylperoxide, and 2,5-dimethyl-2,5-bis(t-butylperoxy)hexane; v) delustering agents of diacylperoxides such as benzoylperoxide and octanoylperoxide; vi) delustering agents of peroxydicarbonates such as bis(4-t-butylcyclohexyl)peroxydicarbonate and di-2-ethylhexylperoxydicarbonate; and vii) delustering agents of peroxyesters such as t-butylperoxymaleic acid, 2,5-dimethyl-2,5-bis(benzoylperoxy)hexane, and bis(t-butylperoxy)isophthalate. The present invention is not limited to the above-described delustering agents; rather, it is contemplated that other delustering agents having similar properties are considered to be well within the scope of the present invention.

It is possible to provide a molded resin product that exhibits good visual characteristics using the above-described resin composition. The resin composition, formed in accordance with the present invention, prevents flashing stripes and changes in luster those portions where thickness changes. Thus, even if grain gap or poor transfer arises, any difference in surface appearances is lost between the thickness changing portions and the thick wall portion and the thin wall portion. As a result, changes in luster or flashing can be prevented. This is a direct result of the surface state of the molded resin product using the above-described resin composition, which is rough so that the gloss of the composition itself is low. It is contemplated that the exterior surfaces of the molded resin product have a measurable rough or textured surface, which is a direct result of the resin composition of the present invention.

The molded resin product of the present invention can be molded by any known method, such as injection molding or extrusion molding. The molded resin product is preferably a product molded by injection molding. In this case, the advantageous effect of the present invention can be effectively exhibited.

Typically, as the thickness difference between a thick wall portion and a thin wall portion increases, flashing is more likely to be generated. This phenomena is not exhibited when using a resin composition formed in accordance with the present invention. Such flashing stripes and changes is luster can be effectively suppressed in the wall thickness change portion by use of the resin composition formed as described herein above.

Further, the resin composition formed in accordance with the present invention is especially useful when the wall thickness change ratio DV of the thickness S of the thin wall portion to the thickness T of the thick wall portion is preferably between 20–99%. Flashing stripes and changes in luster can effectively be prevented. If the ratio is below 20%, a difference in thickness between the thick wall portion and the thin wall portion is so small that flashing stripes are not easily generated. Thus, under such condition it is unnecessary that molding be performed using the resin composition of the present invention. If the ratio is over 99%, the thickness S of the thin wall portion becomes so thin that strength may be insufficient.

When the wall thickness change ratio DV of the thickness S of the thin wall portion to the thickness T of the thick wall portion is between 50–99%, the reductions in flashing stripes and changes in luster are most effectively exhibited.

The wall thickness change ratio DV(%) of the thickness S of the thin wall portion to the thickness T of the thick wall portion can be calculated from the following equation (1):

$$DV(\%)=100\times(T-S)/T \qquad (1)$$

Molded resin products according to the present invention will be described by way of Examples 1–11, which will be compared with Comparative Examples A–E. Molded resin products according to Examples 1–11 and Comparative Examples A–E were first molded. Components of resin compositions used for the molded resin products were as follows.

(1) PP: a polypropylene block copolymer containing 15% by weight of ethylene, melt flow rate (referred to as MFR hereinafter)=33 g/10 min.(230° C.);

(2) PE-1: polyethylene, density=0.919 g/cm3, MFR=5.1 g/10 min.(190° C.);

(3) PE-2: polyethylene, density=0.956 g/cm3, MFR=9 g/10 min.(190° C.);

(4) PBM-1: a propylene/butene copolymer containing 28% by weight of butene, MFR=6 g/10 min.(230° C.);

(5) PBM-2: a propylene/butene copolymer containing 7% by weight of butene, MFR=8 g/10 min.(230° C.);

(6) EMB: an ethylene/butene copolymer rubber, glass transition temperature = −60° C., MFR=0.5 g/10 min. (190° C.);

(7) EPM-1: an ethylene/propylene copolymer rubber, glass transition temperature = −60° C., MFR=0.9 g/10 min.(230° C.);

(8) EPM-2: an ethylene/propylene copolymer rubber, glass transition temperature = −39° C., MFR=1 g/10 min.(230° C.); and (9) delustering agent: α,α'-bis(t-butylperoxy) diisopropylbenzene.

The resin components (1)–(9) were appropriately blended as shown in Tables 1–3 to obtain blended resin compositions for use in forming molded resin products. In Tables 1–3, each of the amounts of the components (1)–(8) is represented by a weight percentage (% by weight) in blend components wherein they were mixed. The content of the delustering agent (9) is represented by parts by weight per 100 parts by weight of the total content of the blend components (1)–(8).

Figure 3:
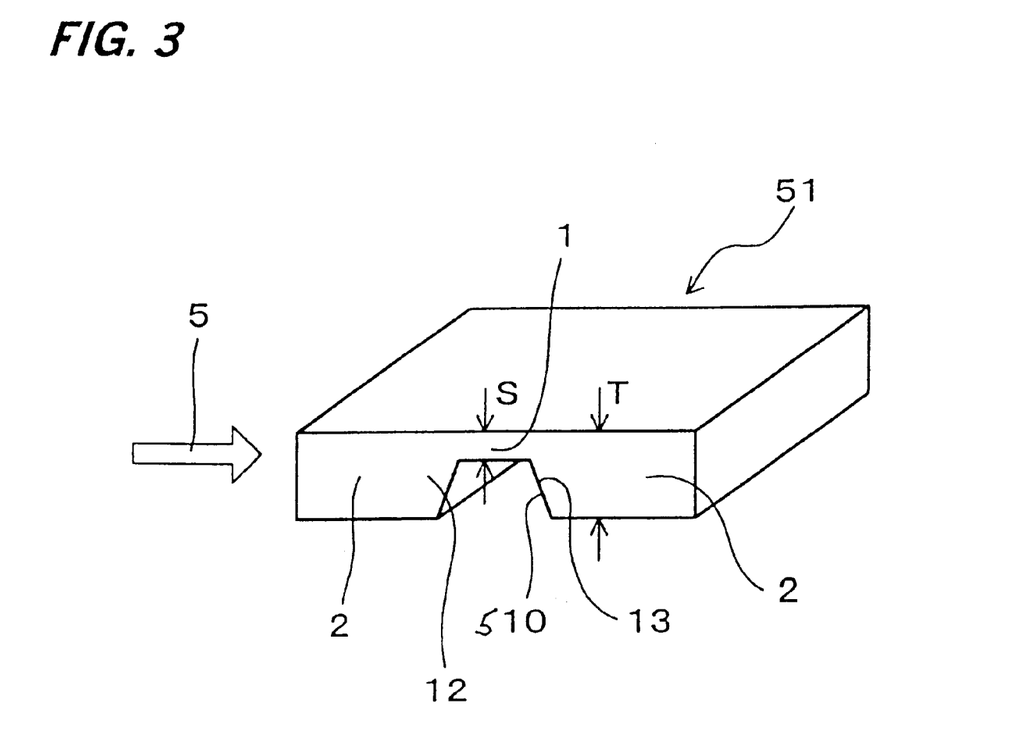
FIG. 3 is a perspective view of a molded resin product formed in accordance with present invention.

The blended resin compositions were injected into a cavity of a mold by injection molding. The shape of the mold cavity was made so as to obtain a plate-form molded resin product 51 having a groove 510, as shown in FIG. 3. Injection conditions were set up as follows: molten resin temperature=200° C., injection speed=150 cm3/sec., and injection pressure=50 kgf/cm2. The molded resin product 51 was then cooled and released from the mold. The thickness change ratios for each of the examples was 68%.

Various properties were measured for each of the examples 1–11 and for the comparative examples A–E. The measured results and observations are illustrated in Tables 1–3, presented below.

Measurement of grain gloss and mirror planes: Measurements were taken according to JIS Z8741. Grain gloss was measured on the basis of grain C.

Flashing: Flashing stripes in flow enlargement portions and flow choke portions was visually observed according to the following five grades.

5: No flashing observed.
4: Some slight flashing observed but changes in luster were not conspicuous.
3: Flashing was clearly observed.
2: Flashing was somewhat remarkably observed.
1: Considerable flashing was considerably remarkably observed.

Flow mark: The molded resin products were visually observed for any mark of resin flow (flow mark) was generated in the surface of the molded resin products. Examples where no flow mark was generated were designated as O. Examples where a flow mark or flow marks were generated were designates as X.

A/B cleavage: Airbag covers were injection-molded from the resin compositions. The airbag covers were set up to an airbag device and tested. The molded resin product which cleaved at a given position were designated as O. The molded resin product which cleaved at a position other than a given position or the resin whose fragments were scattered were designated as X.

Tension test: Tensile strength was measured according to JIS K6301.

IZOD impact test: IZOD impact strength was measured according to JIS K7110.

The measured results according to the above-mentioned tests are shown in Tables 1–3. In these tables, "NB" means non break.

TABLE 1

|  | Target Value | Example 1 | Example 2 | Example 3 | Example 4 | Example 5 | Example 6 |
|---|---|---|---|---|---|---|---|
| (1)PP (C2: 15%) |  | 40 | 40 | 40 | 32 | 44 | 45 |
| (2)PE-1 (r = 0.919) |  | 5 | 5 | 5 | 5 | 5 |  |
| (3)PE-2 (r = 0.956) |  |  |  |  |  |  |  |
| (4)PBM-1 (C4: 28%) |  | 10 | 10 | 10 | 10 | 10 | 10 |
| (5)PBM-2 (C4: 7%) |  |  |  |  |  |  |  |
| (6)EBM (Tg: −60° C.) |  | 45 | 45 | 45 | 53 | 41 | 45 |
| (7)EPM-1 (Tg: −60° C.) |  |  |  |  |  |  |  |
| (8)EPM-2 (Tg: −39° C.) |  |  |  |  |  |  |  |
| (9)Dulustering Agent |  | 0.04 | 0.02 | 0.08 | 0.04 | 0.04 | 0.04 |
| Grain Gloss (%) | 3.0 or less | 1.8 | 2.5 | 1.8 | 1.9 | 2.2 | 2.0 |
| Mirror Planes (%) | 35 or less | 20 | 30 | 18 | 18 | 24 | 20 |
| Flashing Stripes (flow enlargement portion) | 4 or more | 4 | 4 | 4 | 4 | 4 | 4 |
| Flashing Stripes (flow choke portion) | 4 or more | 5 | 5 | 5 | 5 | 5 | 5 |
| Flow Mark | O/X | O | O | O | O | O | O |
| A/B Cleavage | O/X | O | O | O | O | O | O |
| Tensile Strengh (MPa) | 5.0 or more | 10.8 | 10.8 | 10.2 | 10.6 | 10.5 | 9.8 |
| Tensile Elongation (%) | 400 or more | 650 | 660 | 620 | 860 | 570 | 550 |
| IZOD Impact Strength (−35° C.) J/m | 200 or more | NB | NB | NB | NB | 270 | NB |

TABLE 2

|  | Target Value | Example 7 | Example 8 | Example 9 | Example 10 | Example 11 |
|---|---|---|---|---|---|---|
| (1)PP (C2: 15%) |  | 40 | 40 | 37 | 40 | 40 |
| (2)PE-1 (r = 0.919) |  |  | 5 | 8 | 5 | 5 |
| (3)PE-2 (r = 0.956) |  | 5 |  |  |  |  |
| (4)PBM-1 (C4: 28%) |  | 10 | 10 | 10 | 7 | 13 |
| (5)PBM-2 (C4: 7%) |  |  |  |  |  |  |
| (6)EBM (Tg: −60° C.) |  | 45 |  | 45 | 48 | 42 |

TABLE 2-continued

| | Target Value | Example 7 | Example 8 | Example 9 | Example 10 | Example 11 |
|---|---|---|---|---|---|---|
| (7)EPM-1 (Tg: −60° C.) | | | 45 | | | |
| (8)EPM-2 (Tg: − 39° C.) | | | | | | |
| (9)Delustering Agent | | 0.04 | 0.04 | 0.04 | 0.04 | 0.04 |
| Grain Gloss (%) | 3.0 or less | 24 | 1.9 | 1.9 | 2.2 | 2.1 |
| Mirror Planes (%) | 35 or less | 25 | 21 | 19 | 23 | 22 |
| Flashing Stripes (flow enlargement portion) | 4 or more | 4 | 4 | 4 | 4 | 4 |
| Flashing Stripes (flow choke portion) | 4 or more | 5 | 5 | 5 | 5 | 5 |
| Flow Mark | ○/X | ○ | ○ | ○ | ○ | ○ |
| A/B Cleavage | ○/X | ○ | ○ | ○ | ○ | ○ |
| Tensile Strength (MPa) | 5.0 or more | 10.1 | 11.3 | 10.7 | 11.4 | 11.1 |
| Tensile Elongation (%) | 400 or more | 600 | 670 | 630 | 690 | 680 |
| IZOD Impact Strength (−35° C.) J/m | 200 or more | NB | NB | NB | NB | NB |

TABLE 3

| | Target Value | Comparative Example A | Comparative Example B | Comparative Example C | Comparative Example D | Comparative Example E |
|---|---|---|---|---|---|---|
| (1)PP (C2: 15%) | | 40 | 40 | 60 | 15 | 45 |
| (2)PE-1 (r = 0.919) | | 5 | 5 | 5 | 5 | 5 |
| (3)PE-2 (r = 0.956) | | | | | | |
| (4)PBM-1 (C4: 28%) | | 10 | 10 | 10 | 10 | |
| (5)PBM-2 (C4: 7%) | | | | | | |
| (6)EBM (Tg: −60° C.) | | 45 | 45 | 25 | 70 | 50 |
| (7)EPM-1 (Tg: −60° C.) | | | | | | |
| (8)EPM-2 (Tg: −39° C.) | | | | | | |
| (9)Delustering Agent | | | 0.12 | 0.04 | 0.04 | 0.04 |
| Grain Gloss (%) | 3.0 or less | 3.8 | 1.9 | 3.5 | 2.6 | 2.1 |
| Mirror Planes (%) | 35 or less | 60 | 20 | 39 | 27 | 23 |
| Flashing Stripes (flow enlargement portion) | 4 or more | 3 | 4 | 3 | 2 | 3 |
| Flashing Stripes (flow choke portion) | 4 or more | 4 | 4 | 4 | 3 | 4 |
| Flow Mark | ○/X | ○ | X | ○ | X | X |
| A/B Cleavage | ○/X | ○ | X | X | X | ○ |
| Tensile Strength (MPa) | 5.0 or more | 15.0 | 10.0 | 13.5 | 7.4 | 11.5 |
| Tensile Elongation (%) | 400 or more | 800 | 550 | 250 | 850 | 660 |
| IZOD Impact Strength (−35° C.) J/m | 200 or more | NB | 230 | 150 | NB | NB |

It can be understood from the above-mentioned measured results that it is possible to obtain molded resin products where flashing stripes are not conspicuous in those areas where thickness is changing, and there is no generation of flow marks. Furthermore, in above-described examples, A/B cleavage is good, and tensile strength, tensile elongation and IZOD impact strength are sufficient. These properties were obtained by adding 0.02–0.08 part by weight of a delustering agent to 100 parts by weight of blend components comprising 32–45% by weight of the polypropylene block copolymer containing 15% by weight of ethylene, 0–8% by weight of polyethylene, 7–13% by weight of the propylene/butene copolymer, and 41–53% by weight of the ethylene/butene copolymer rubber or the ethylene/propylene copolymer rubber.

In accordance with the present invention, a blended resin composition described in Example 1 was used to mold an airbag cover. The surface of the airbag cover was formed to have a delustered surface.

Figure 4:
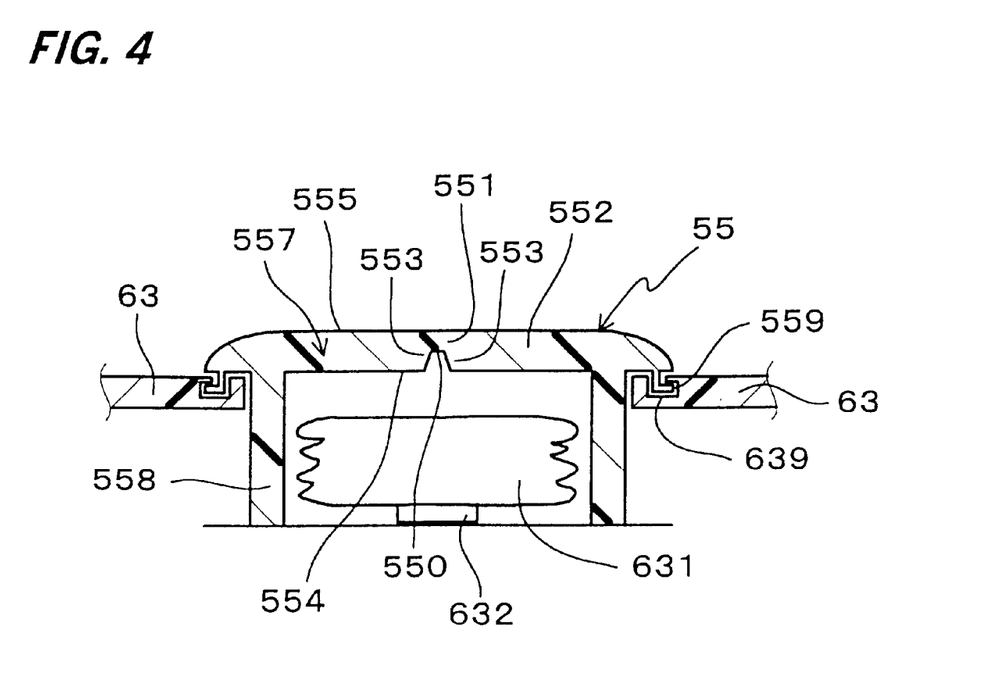
FIG. 4 is a sectional view of an airbag cover formed as a molded resin product in accordance with present invention.

As shown in FIG. 4, the molded airbag cover 55 is composed of a plane portion 557 and a leg portion 558 extending from the circumference of the plane portion 557. The plane portion 557 is composed of a thick wall portion 552 and a thin wall portion 551 formed from the bottom portion of a groove 550 for cleavage of the airbag. Wall thickness change portions 553 are located on both sides of the thin wall portion 551.

Figure 5A:
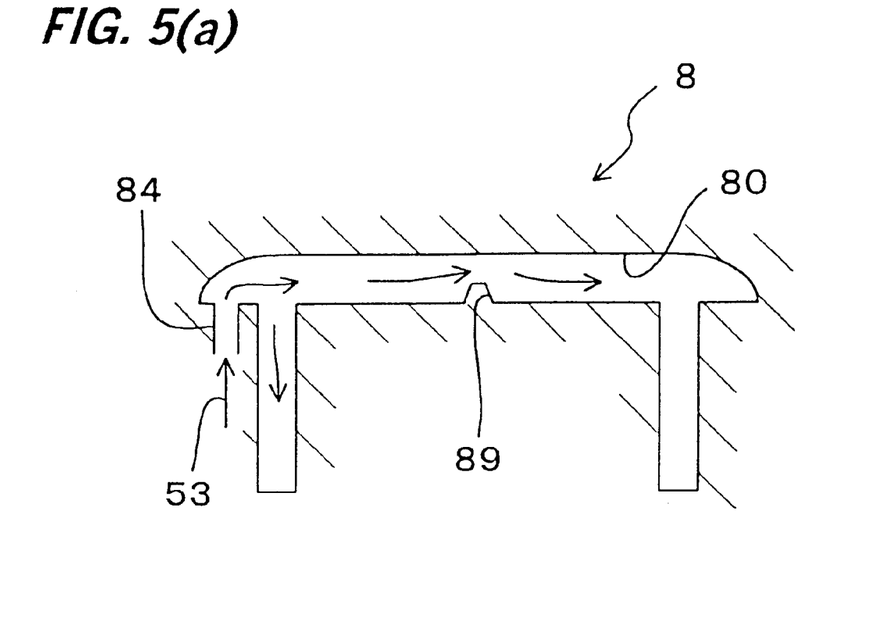
FIG. 5(a) is a sectional view of a mold for molding an airbag cover in accordance with present invention.
Figure 5B:
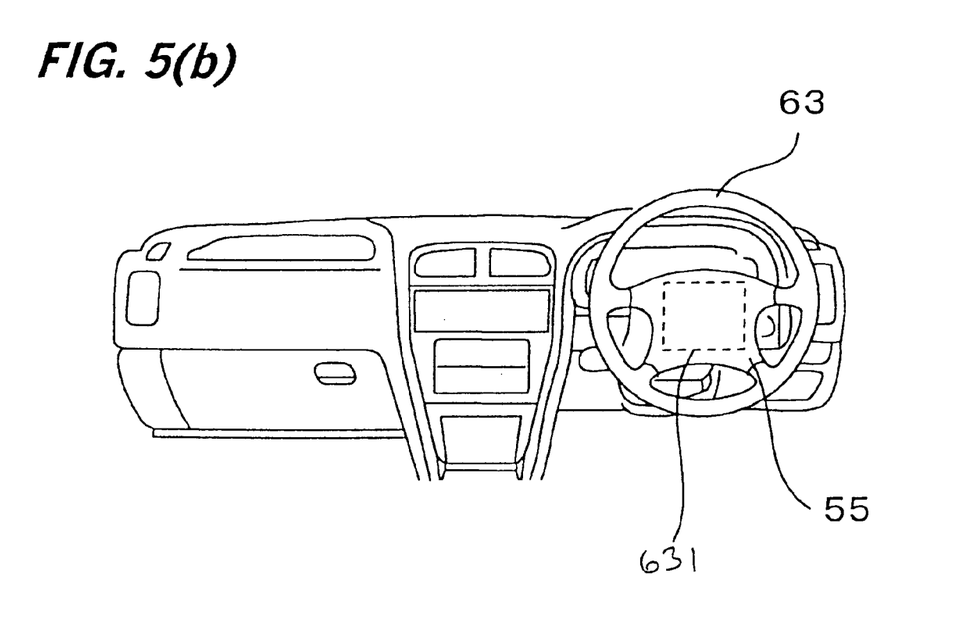
FIG. 5(b) is a plan view of an airbag cover formed in accordance with present invention located on a steering wheel.

As shown in FIG. 5(a), the airbag cover 55 was molded in a mold 8. The mold 8 has a cavity 80 whose shape is substantially the same as that of the airbag cover 55. In the cavity 80, a projection portion 89 is disposed to make the groove 550 in the back surface of the airbag cover. A molten resin composition is injected from a gate 84 into the cavity 80, so as to fill the cavity 80 with the resin composition and the resin composition is hardened. As shown in FIG. 5(b), the resultant airbag cover 55 is set up to a central axis of a steering wheel 63 of a car.

As shown in FIG. 4, the airbag cover 55 is fixed to a concave portion 639 of the steering wheel 63 with an engaging portion 559 located on the circumference of the cover 55. An airbag 631 is put in the airbag cover 55. A collision will trigger an inflator 632 to send air into the airbag 631, so that the airbag 631 is expanded and deployed. The force caused by the expansion of airbag 631 opens a tear seam in the cover as defined by the groove 550 made in a back surface 554, and then the airbag 631 deploys into the car. In the airbag cover produced in accordance with the present invention, flashing stripes and flow marks were not observed. The airbag cover exhibited good overall appearance characteristics.

While this invention has been described in conjunction with specific embodiments thereof, it is evident that many alternatives, modifications and variations will be apparent to those skilled in the art without departing from the scope of the present invention. Accordingly, the preferred embodiments of the invention as set forth herein are intended to be illustrative, not limiting. Thus, it is intended that the present invention covers the modifications and variations of the invention, provided they come within the scope of the appended claims and their equivalents.

What is claimed is:

1. A molded resin product comprising:

at least one thick wall portion;

at least one thin wall portion; and at least one thickness changing portion extending between said at least one thick wall portion and said at least one thin wall portion, wherein said molded resin product being formed from a resin composition comprising 0.01–0.1 part by weight of a delustering agent and 100 parts by weight of a blend of components, said blend of components comprising: 30–50% by weight of a polypropylene block copolymer containing 4–20% by weight of ethylene, 0–10% by weight of polyethylene, 5–15% by weight of a propylene/butene copolymer, and 40–60% by weight of an ethylene/α-olefin copolymer rubber.

2. The molded resin product according to claim 1, wherein said molded resin product is formed by injection molding.

3. The molded resin product according to claim 1, wherein the butene content by percentage in the propylene/butene copolymer is 10–30% by weight.

4. The molded resin product according to claim 1, wherein the ethylene/α-olefin copolymer rubber has a glass transition point of −45° C. or lower.

5. The molded resin product according to claim 1, wherein the polyethylene has a density of not more than 0.95 g/cm3.

6. The molded resin product according to claim 1, wherein the thickness of said at least one thickness changing portion gradually decreases from said at least one thick wall portion to said at least one thin wall portion.

7. The molded resin product according to claim 1, wherein the thickness of said at least one thickness changing portion gradually increases from said at least one thin wall portion to said at least one thick wall portion.

8. The molded resin product according to claim 1, wherein said at least one thickness changing portion has at least one stepwise decrease in thickness between said at least one thick wall portion and said at least one thin wall portion.

9. The molded resin product according to claim 1, wherein said at least one thickness changing portion has at least one stepwise increase in thickness between said at least one thin wall portion and said at least one thick wall portion.

10. A resin composition comprising:

0.01–0.1 part by weight of a delustering agent; and 100 parts by weight of a blend of components, said blend of components comprising 30–50% by weight of a polypropylene block copolymer containing 4–20% by weight of ethylene, 0–10% by weight of polyethylene, 5–15% by weight of a propylene/butene copolymer, and 40–60% by weight of an ethylene/α-olefin copolymer rubber.

11. The resin composition according to claim 10, wherein the ethylene/α-olefin copolymer rubber has a glass transition point of −45° C. or lower.

12. The resin composition according to claim 10, wherein the polyethylene content is 0% by weight.

13. The resin composition according to claim 10, wherein the polyethylene has a density of not more than 0.95 g/cm3.

14. The resin composition according to claim 10, wherein the butene content by percentage in the propylene/butene copolymer is 10–30% by weight.

* * * * *